US009076281B2

(12) United States Patent
Martin et al.

(10) Patent No.: US 9,076,281 B2
(45) Date of Patent: Jul. 7, 2015

(54) CASHLESS GAMING SYSTEM AND METHOD WITH MONITORING

(75) Inventors: Richard L. Martin, Alpharetta, GA (US); Edward J. Hole, Jr., Portsmouth, RI (US); Robert C. Angell, West Greenwich, RI (US); John A. Santini, Jr., Wakefield, RI (US); Ian Mitchell, Portsmouth, RI (US); Dave William Costantino, Cranston, RI (US)

(73) Assignee: Oneida Indian Nation, Oneida, NY (US)

( * ) Notice: Subject to any disclaimer, the term of this patent is extended or adjusted under 35 U.S.C. 154(b) by 2202 days.

(21) Appl. No.: 11/849,018

(22) Filed: Aug. 31, 2007

(65) Prior Publication Data

US 2008/0026829 A1 Jan. 31, 2008

Related U.S. Application Data

(63) Continuation of application No. 10/400,693, filed on Mar. 28, 2003, now Pat. No. 7,963,843.

(51) Int. Cl.
*A63F 13/00* (2014.01)
*G07F 17/32* (2006.01)

(52) U.S. Cl.
CPC .................................... *G07F 17/32* (2013.01)

(58) Field of Classification Search
USPC ............................. 463/16–20, 25, 29, 39–43
See application file for complete search history.

(56) References Cited

U.S. PATENT DOCUMENTS 3,786,234 A 1/1974 Trent et al.
3,810,627 A 5/1974 Levy
3,909,002 A 9/1975 Levy
4,032,946 A 6/1977 Wakatsuki et al.
4,033,588 A 7/1977 Watts
4,108,361 A 8/1978 Krause
4,108,364 A 8/1978 Tanaka et al.
4,240,635 A 12/1980 Brown
4,275,456 A 6/1981 Tanaka et al.
4,283,709 A 8/1981 Lucero et al.

(Continued)

FOREIGN PATENT DOCUMENTS

EP 0769769 A1 4/1997
WO WO-8906998 8/1989

(Continued)

OTHER PUBLICATIONS

"PCT Application No. PCT/US2001/001642 International Preliminary Report on Patentability", Sep. 6, 2002 , 4 pages.

(Continued)

*Primary Examiner* — Sunit Pandya
(74) *Attorney, Agent, or Firm* — DeLizio Gilliam, PLLC

(57) ABSTRACT

A wagering game system is described herein. In embodiments the wagering game system comprises a plurality of player terminals configured to present wagering games and to collect player activity information associated with the wagering games, the player activity information indicating player inputs and financial transactions. In embodiments, the wagering game system further comprises one or more account servers configured to receive the player activity information and to perform the financial transactions on player accounts and a monitoring system configured to receive the player activity information and to remotely disable ones of the plurality of player terminals.

17 Claims, 9 Drawing Sheets

(56) References Cited

U.S. PATENT DOCUMENTS

| | | | | |
|---|---|---|---|---|
| 4,322,612 | A | 3/1982 | Lange | |
| 4,323,770 | A | 4/1982 | Dieulot et al. | |
| 4,335,809 | A | 6/1982 | Wain | |
| 4,339,798 | A | 7/1982 | Hedges et al. | |
| 4,359,631 | A | 11/1982 | Lockwood et al. | |
| 4,373,726 | A | 2/1983 | Churchill et al. | |
| 4,467,424 | A | 8/1984 | Hedges et al. | |
| 4,494,197 | A | 1/1985 | Troy et al. | |
| 4,575,622 | A | 3/1986 | Pellegrini | |
| 4,636,951 | A | 1/1987 | Harlick | |
| 4,648,600 | A | 3/1987 | Olliges | |
| 4,669,596 | A | 6/1987 | Capers et al. | |
| 4,669,730 | A | 6/1987 | Small | |
| 4,689,742 | A | 8/1987 | Troy et al. | |
| 4,760,527 | A | 7/1988 | Sidley | |
| 4,764,666 | A | 8/1988 | Bergeron | |
| 4,815,741 | A | 3/1989 | Small | |
| 4,832,341 | A | 5/1989 | Muller et al. | |
| 4,856,787 | A | 8/1989 | Itkis | |
| 4,875,164 | A | 10/1989 | Monfort | |
| 4,880,237 | A | 11/1989 | Kishishita | |
| 4,882,473 | A | 11/1989 | Bergeron et al. | |
| 4,926,327 | A | 5/1990 | Sidley | |
| 4,937,853 | A | 6/1990 | Brule et al. | |
| 4,994,908 | A | 2/1991 | Kuban et al. | |
| 5,007,649 | A | 4/1991 | Richardson | |
| 5,038,022 | A | 8/1991 | Lucero | |
| 5,042,809 | A | 8/1991 | Richardson | |
| 5,083,271 | A | 1/1992 | Thacher et al. | |
| 5,096,195 | A | 3/1992 | Gimmon | |
| 5,119,295 | A | 6/1992 | Kapur | |
| 5,135,224 | A | 8/1992 | Yamamoto et al. | |
| 5,159,549 | A | 10/1992 | Hallman, Jr. et al. | |
| 5,179,517 | A | 1/1993 | Sarbin et al. | |
| 5,192,854 | A | 3/1993 | Counts | |
| 5,197,094 | A | 3/1993 | Tillery et al. | |
| 5,223,698 | A | 6/1993 | Kapur | |
| 5,235,509 | A | 8/1993 | Mueller et al. | |
| 5,259,613 | A | 11/1993 | Marnell, II | |
| 5,265,874 | A | 11/1993 | Dickinson et al. | |
| 5,277,424 | A | 1/1994 | Wilms | |
| 5,287,269 | A | 2/1994 | Dorrough et al. | |
| 5,290,033 | A | 3/1994 | Bittner et al. | |
| 5,297,802 | A | 3/1994 | Pocock et al. | |
| 5,317,135 | A | 5/1994 | Finocchio | |
| 5,321,241 | A | 6/1994 | Craine | |
| 5,324,035 | A | 6/1994 | Morris et al. | |
| 5,326,104 | A | 7/1994 | Pease et al. | |
| 5,332,076 | A | 7/1994 | Ziegert | |
| 5,348,299 | A | 9/1994 | Clapper, Jr. | |
| 5,371,345 | A | 12/1994 | LeStrange et al. | |
| 5,373,440 | A | 12/1994 | Cohen et al. | |
| 5,408,417 | A | 4/1995 | Wilder | |
| 5,429,361 | A * | 7/1995 | Raven et al. | 463/25 |
| 5,440,108 | A | 8/1995 | Tran et al. | |
| 5,457,306 | A | 10/1995 | Lucero | |
| 5,470,079 | A | 11/1995 | LeStrange et al. | |
| 5,473,772 | A | 12/1995 | Halliwell et al. | |
| 5,475,205 | A | 12/1995 | Behm et al. | |
| 5,491,326 | A | 2/1996 | Marceau et al. | |
| 5,507,491 | A | 4/1996 | Gatto et al. | |
| 5,524,888 | A | 6/1996 | Heidel | |
| 5,536,008 | A | 7/1996 | Clapper, Jr. | |
| 5,551,692 | A | 9/1996 | Pettit et al. | |
| 5,559,312 | A | 9/1996 | Lucero | |
| 5,575,374 | A | 11/1996 | Orus et al. | |
| 5,575,717 | A | 11/1996 | Houriet, Jr. et al. | |
| 5,580,310 | A | 12/1996 | Orus et al. | |
| 5,580,311 | A | 12/1996 | Haste, III | |
| 5,581,461 | A | 12/1996 | Coll et al. | |
| 5,586,937 | A * | 12/1996 | Menashe | 463/41 |
| 5,609,337 | A | 3/1997 | Clapper, Jr. | |
| 5,611,730 | A | 3/1997 | Weiss | |
| 5,613,680 | A | 3/1997 | Groves et al. | |
| 5,613,912 | A | 3/1997 | Slater | |
| 5,627,356 | A | 5/1997 | Takemoto | |
| 5,645,485 | A | 7/1997 | Clapper, Jr. | |
| 5,655,961 | A | 8/1997 | Acres et al. | |
| 5,655,966 | A | 8/1997 | Werdin, Jr. et al. | |
| 5,674,128 | A | 10/1997 | Holch et al. | |
| 5,697,482 | A | 12/1997 | Orus et al. | |
| 5,722,890 | A | 3/1998 | Libby et al. | |
| 5,732,398 | A | 3/1998 | Tagawa | |
| 5,735,432 | A | 4/1998 | Stoken et al. | |
| 5,737,418 | A | 4/1998 | Saffari et al. | |
| 5,749,784 | A | 5/1998 | Clapper, Jr. | |
| 5,755,621 | A | 5/1998 | Marks et al. | |
| 5,761,647 | A | 6/1998 | Boushy | |
| 5,762,552 | A | 6/1998 | Vuong et al. | |
| 5,770,533 | A | 6/1998 | Franchi | |
| 5,779,545 | A | 7/1998 | Berg et al. | |
| 5,797,794 | A | 8/1998 | Angell | |
| 5,800,269 | A | 9/1998 | Holch et al. | |
| 5,810,664 | A | 9/1998 | Clapper, Jr. | |
| 5,811,772 | A | 9/1998 | Lucero | |
| 5,816,918 | A | 10/1998 | Kelly et al. | |
| 5,823,879 | A | 10/1998 | Goldberg et al. | |
| 5,830,067 | A | 11/1998 | Graves et al. | |
| 5,830,068 | A | 11/1998 | Brenner et al. | |
| 5,830,069 | A | 11/1998 | Soltesz et al. | |
| 5,836,817 | A | 11/1998 | Acres et al. | |
| 5,839,956 | A | 11/1998 | Takemoto | |
| 5,857,911 | A | 1/1999 | Fioretti et al. | |
| 5,885,158 | A | 3/1999 | Torango et al. | |
| 5,902,983 | A | 5/1999 | Crevelt et al. | |
| 5,917,725 | A | 6/1999 | Thacher et al. | |
| 5,919,091 | A | 7/1999 | Bell et al. | |
| 5,928,082 | A | 7/1999 | Clapper, Jr. | |
| 5,949,042 | A | 9/1999 | Dietz, II et al. | |
| 5,949,411 | A | 9/1999 | Doerr et al. | |
| 5,952,640 | A | 9/1999 | Lucero | |
| 5,959,277 | A | 9/1999 | Lucero | |
| 5,971,271 | A | 10/1999 | Wynn et al. | |
| 5,971,849 | A | 10/1999 | Falciglia | |
| 5,984,779 | A | 11/1999 | Bridgeman et al. | |
| 6,001,016 | A | 12/1999 | Walker et al. | |
| 6,014,594 | A | 1/2000 | Heidel et al. | |
| 6,024,640 | A | 2/2000 | Walker et al. | |
| 6,039,648 | A | 3/2000 | Guinn et al. | |
| 6,048,269 | A | 4/2000 | Burns et al. | |
| 6,049,823 | A | 4/2000 | Hwang | |
| 6,050,487 | A | 4/2000 | Bonifas | |
| 6,089,982 | A | 7/2000 | Holch et al. | |
| 6,093,100 | A | 7/2000 | Singer et al. | |
| 6,101,477 | A | 8/2000 | Hohle et al. | |
| 6,110,041 | A | 8/2000 | Walker et al. | |
| 6,113,495 | A | 9/2000 | Walker et al. | |
| 6,120,024 | A | 9/2000 | Lind | |
| 6,183,366 | B1 | 2/2001 | Goldberg et al. | |
| 6,244,958 | B1 | 6/2001 | Acres | |
| 6,254,483 | B1 | 7/2001 | Acres | |
| 6,264,560 | B1 | 7/2001 | Goldberg et al. | |
| 6,264,561 | B1 | 7/2001 | Saffari et al. | |
| 6,280,326 | B1 | 8/2001 | Saunders | |
| 6,280,328 | B1 | 8/2001 | Holch et al. | |
| 6,319,125 | B1 | 11/2001 | Acres | |
| 6,332,099 | B1 | 12/2001 | Heidel et al. | |
| 6,361,437 | B1 | 3/2002 | Walker et al. | |
| 6,371,852 | B1 | 4/2002 | Acres | |
| 6,431,983 | B2 | 8/2002 | Acres | |
| 6,471,590 | B2 | 10/2002 | Saunders | |
| 6,508,709 | B1 | 1/2003 | Karmarkar | |
| 6,645,077 | B2 | 11/2003 | Rowe | |
| 6,729,957 | B2 | 5/2004 | Burns et al. | |
| 6,729,958 | B2 | 5/2004 | Burns et al. | |
| 6,736,725 | B2 | 5/2004 | Burns et al. | |
| 6,800,030 | B2 | 10/2004 | Acres | |
| 6,846,238 | B2 | 1/2005 | Wells | |
| 6,851,607 | B2 | 2/2005 | Orus et al. | |
| 7,063,617 | B2 | 6/2006 | Brosnan et al. | |
| 7,470,196 | B1 | 12/2008 | Joshi | |
| 2001/0044337 | A1 | 11/2001 | Rowe et al. | |
| 2002/0115487 | A1 | 8/2002 | Wells | |
| 2002/0166126 | A1 | 11/2002 | Pugh | |

(56) References Cited

U.S. PATENT DOCUMENTS

| | | | | |
|---|---|---|---|---|
| 2003/0032407 | A1 | 2/2003 | Mages | |
| 2004/0166940 | A1* | 8/2004 | Rothschild | 463/42 |
| 2005/0101383 | A1 | 5/2005 | Wells | |
| 2005/0277462 | A1 | 12/2005 | Ellis | |
| 2006/0287098 | A1 | 12/2006 | Morrow et al. | |
| 2008/0020826 | A1 | 1/2008 | Holch et al. | |

FOREIGN PATENT DOCUMENTS

| | | |
|---|---|---|
| WO | WO-95/30944 | 11/1995 |
| WO | WO-95/34040 | 12/1995 |
| WO | WO-97/44750 | 11/1997 |
| WO | WO-98/40141 | 9/1998 |
| WO | WO-03045517 | 6/2003 |
| WO | WO-03089088 | 10/2003 |

OTHER PUBLICATIONS

"PCT Application No. PCT/US2003/009601 International Preliminary Report on Patentability", Dec. 8, 2005 , 3 pages.
"PCT Application No. PCT/US2003/009601 International Search Report", Oct. 28, 2003 , 1 page.
"U.S. Appl. No. 08/391,509 Final Office Action", Aug. 2, 1996 , 7 pages.
"U.S. Appl. No. 08/391,509 Office Action", Apr. 26, 1996 , 10 pages.
"U.S. Appl. No. 08/391,509 Office Action", Nov. 17, 1995 , 7 pages.
"U.S. Appl. No. 08/840,694 Final Office Action", Mar. 30, 1999 , 6 pages.
"U.S. Appl. No. 08/840,694 Office Action", Sep. 13, 1999 , 5 pages.
"U.S. Appl. No. 08/840,694 Office Action", Dec. 9, 1998 , 5 pages.
"U.S. Appl. No. 08/840,695 Office Action", Apr. 15, 1998 , 9 pages.
"U.S. Appl. No. 08/877,375 Final Office Action", Oct. 30, 2000 , 13 pages.
"U.S. Appl. No. 08/877,375 Office Action", Mar. 16, 2000 , 12 pages.
"U.S. Appl. No. 08/877,375 Office Action", Sep. 27, 1999 , 15 pages.
"U.S. Appl. No. 09/488,556 Final Office Action", Aug. 5, 2002 , 11 pages.
"U.S. Appl. No. 09/488,556 Final Office Action", Jun. 28, 2005 , 12 pages.
"U.S. Appl. No. 09/488,556 Final Office Action", Jul. 15, 2003 , 12 pages.
"U.S. Appl. No. 09/488,556 Office Action", Mar. 25, 2004 , 10 pages.
"U.S. Appl. No. 09/488,556 Office Action", Sep. 25, 2001 , 13 pages.
"U.S. Appl. No. 09/488,556 Office Action", Jan. 2, 2003 , 25 pages.
"U.S. Appl. No. 09/921,782 Final Office Action", Apr. 6, 2004 , 15 pages.
"U.S. Appl. No. 09/921,782 Final Office Action", Jan. 26, 2005 , 23 pages.
"U.S. Appl. No. 09/921,782 Office Action", Aug. 12, 2003 , 12 pages.
"U.S. Appl. No. 09/921,782 Office Action", Dec. 12, 2006 , 7 pages.
"U.S. Appl. No. 10/400,693 Final Office Action", Nov. 15, 2006 , 18 pages.
"U.S. Appl. No. 10/400,693 Office Action", Apr. 12, 2006 , 14 pages.
"U.S. Appl. No. 10/400,693 Office Action", Jun. 22, 2009 , 8 pages.
"European Application No. 03716884.6 Search Report", May 26, 2011 , 3 pages.
"U.S. Appl. No. 11/833,637 Final Office Action", Jan. 21, 2011 , 12 pages.
"CA Application No. 2399691 Examination Report", Nov. 4, 2011 , 5 pages.
"U.S. Appl. No. 11/833,637 Office Action", May 31, 2013 , 16 Pages.
"U.S. Appl. No. 11/833,637 Office Action", Oct. 14, 2011 , 14 pages.
"AU Application No. 2011229695 Examination Report", Nov. 29, 2012 , 4 pages.
"Canadian Application No. 2,520,216 Examiners Report", Feb. 15, 2012 , 2 pages.
"U.S. Appl. No. 11/833,637 Final Office Action", May 2, 2012 , 15 pages.
"U.S. Appl. No. 11/833,637 Final Office Action", Nov. 6, 2013 , 13 Pages.
"Pot-O-Gold", *19" Touchscreen Multi-Game Terminal Toucheasy Keno Play Description* (2 pages), Jan. 26, 1995.
"Pot-O-Gold", *19" Touchscreen Multi-Game Terminal Superpick Lotto Play Description* (2 pages), Jan. 26, 1995.
"Pot-O-Gold", *19" Touchscreen Multi-Game Terminal Touch 6 Lotto Play Description* (2 pages), Jan. 26, 1995.
"Pot-O-Gold", *19" Touchscreen Multi-Game Terminal Touch 6 Lotto Technical Description* (1 page), Jan. 26, 1995.
"Pot-O-Gold", *19- Touchscreen Multi-Game Terminal Supergold Bingo Play Description* (2 pages), Jan. 26, 1995.
"Casinolink", *Mikohn Worldwide* (4 pages), 1996.
"Casinolink System", *Mikohn WorldWide* (8 pages), 1996.
"QuickTrack", *Quick Track Gaming, Inc.* (44 pages), Mar. 18, 1997.
"Oasis II", *CDS Systems and Services*, 1996.
"The Future of Gaming Today", *Casino Data Systems* (6 pages), 1996.
"Welcome to Casino Data Systems", *Casino Data Systems* (5 pages), 1996.
"Software Offerings, Advanced Computer Services", (8 pages), 1996.
"SafeJack", *Mikohn Worldwide* (15 pages), 1996.
Monteau, Harold "National Gaming Indian Commission", Jun. 6, 1919.
Washburn, Kevin K., "National Gaming Indian Commission", Mar. 13, 2001.
Banks, Michael A., "America Online: A Graphics-Based Success" *Link-UP*, (Feb. 1992),pp. 12, 14 and 15.
"Casino Systems Solutions", *IGT International Game Technology*, (1997).
"Introducing a World of Opportunities, Bally Systems", *Bally Systems*, 1997.
Yerak, Becky "At Cashless Slots: You've got mail, and a jackpot" *USA Today*, (Nov. 13, 2000), 2E.
"*AT&T Corp.* v. *Coeur D'Alene Tribe*, 45 F. Supp. 2d 995 (D. Idaho 1998)", (1998).
"S. 692, 106th Congress, 1st Session", 1999.
"H.R. 3125, 106th Congress, 2d Session", Nov. 21, 1999.
"Amendment in the Nature of a Substitute H.R. 3125, Offered by Mr. Goodlatte of Virginia", 1999.
"Instant Keno Specification", *multiple drafts captioned "Keno" and "Instant Keno,"* undated (38 pages), Nov. 12, 2003.
"Instant Keno—Cashless Automated Keno Writer Stations", *Imagineering Systems, Inc.* undated (6 pages), Nov. 12, 2003.
"The Keno People", *Imagineering Systems, Inc.*, undated (2 pages), Jun. 27, 1994.
Samboy, T. B., "letter to Hon. Richard F. Corbisiero, Jr.", *"Review of Instant Keno"* (6 pages), (Jun. 1, 1994).
Samboy, T. B., "letter to Carl Conti", (2 pages), (Jun. 13, 1994).
Samboy, T. B., "letter to Hon. Richard F. Corbisiero, Jr.", "*Recommendations Concerning Instant Keno*" (7 pages), (Jun. 14, 1994).
Smith, Katherine A., "letter to Hon. James R. Hurley", "*Imagineering Computerized Keno System*" (4 pages), (Jun. 15, 1994).
Minder, Jacqueline L., "letter to Ron Mach", (1 page), (Jun. 20, 1994).
Conti, Carl "letter to Bruce T. Samboy", (2 pages), (Jun. 27, 1994).
Samboy, Bruce T., "letter to Carl Conti" "*Imagineering—Instant Keno and Gaming Enterprise Registration*"(2 pages), (Jul. 1, 1994).
Holch, Niels C., "letter to Hon. Richard F. Corbisiero, Jr.", (1 page), (Jul. 12, 1994).
Corbisiero, Jr., Richard F., "letter to Niels C. Holch", (1 page), (Jul. 14, 1994).
"High-Tech Gambling Debuts at Turning Stone", *Syracuse Post Standard* (1 page), (Feb. 27, 1995).
Gatley, Susan "Turning Stone Inter-Office Memorandum to Bong Woo", re *Instant Keno Issues* (3 pages), (Oct. 17, 1994).
"Turning Stone Inter-Office Memorandum to Bruce Samboy re Instant Keno", *Observations and Recommendations*, dated Nov. 8, 1994 (2 pages), (Nov. 8, 1994).

(56) References Cited

OTHER PUBLICATIONS

"Standing Stone Gaming: Open Gaming Protocol (OGP) Specification", *Integrated Performance Decisions* Version 2.1 (Apr. 5, 1999), 1-58.
"Kenilworth-Systems; (KENS) Australia kicks off cashless gambling; Kenilworth signs contract valued at over $7 million", *Business Wire*, 570 words, (Apr. 27, 1988).
"New York Company Wagers That Cashless Betting Will Make It Flush", Los Angeles Times, Dec. 28, 1990 Friday, *Home Edition Business*; Part D; p. 11; col. 1; Financial Desk (1182 words), (Dec. 28, 1990).
"Stockholders of Kenilworth Systems, in Chapter 7 liquidation, to receive exchange offer from CashTek", *Business Wire*, Sep. 21, 1992 (454 words), (Sep. 21, 1992).
"Tabaret A World First in Gambling Technology", 1995.
"U.S. Appl. No. 11/833,637 Office Action", Feb. 25, 2014, 12 Pages.
"CA Application No. 2399691 Examiners Report", Sep. 12, 2013 , 6 pages.
"Canadian Application No. 2,520,216 Examiners Report", Aug. 12, 2014, 3 pages.
"U.S. Appl. No. 10/400,693 Final Office Action", Mar. 10, 2010 , 13 pages.
"U.S. Appl. No. 11/833,637 Office Action", May 12, 2010 , 19 pages.

* cited by examiner

CASHLESS GAMING SYSTEM AND METHOD WITH MONITORING

RELATED APPLICATIONS

This application is a continuation of U.S. patent application Ser. No. 10/400,693 filed on Mar. 28, 2003.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, Oneida Indian Nation

FIELD

This invention relates generally to the field of computer-controlled games, and more particularly to the field of cashless computer-controlled games.

BACKGROUND

Over the years, people have used several different types of coin operated gaming devices. The most ubiquitous is the conventional slot machine. To operate a slot machine, a player inserts one or more coins or bills (referred to generically as coins) into a coin receptacle and then takes some action, such as pulling a handle or pushing a button. In response, the machine generates some output determined solely by chance. If that output fits into one of several narrowly defined categories, then the player is rewarded with an amount of money reflecting the particular output and the odds of obtaining it.

Despite their popularity, traditional slot machines have several features which some find undesirable. For example, because they are mechanical devices, they often jam and require frequent repair. Also, they require coins, which forces establishments having the slot machines to provide a great deal of security and accounting checks to avoid theft or corruption. Players are also susceptible to the loss or theft of the coins.

As a substitute for coins, some systems use alternative items of value, such as tokens, tickets, or magnetic cards. In such systems, players insert an item of value into a player terminal equipped with an input device, such as a magnetic card reader, in order to play a game. However, these alternative items of value suffer from the same problems of potential loss or theft as traditional coin-based games. Furthermore, player terminals must typically be retrofitted with input devices to accept the alternative items of value, increasing the expense of producing player terminals and increasing the incidence of player terminal maintenance and repair.

Also, many jurisdictions prohibit slot machines, which are defined as devices that both receive and dispense items of value, such as coins, and which each have their own set of odds. Under many jurisdictions' laws, this prohibition extends to machines that accept alternative items of value, such as tokens or magnetic cards.

In addition to the drawbacks associated with coins, most slot machines are designed only to play a single game, such as a lottery game, a video poker game, or a keno-type game. Players wishing to play a specific game must often go in search of a machine to play that game. The computer revolution, however, greatly aided the gaming industry. For example, in one keno game, a single computer can show the same keno game on several displays so many players can participate. This type of system also avoids the need for players to continually insert coins into a machine because the computer monitors their accounts. Such a system, however, still has somewhat limited capabilities, not the least of which is the system only allows players to choose one type of game. Also, the PC-based control has limited processing and accounting capabilities.

Another system, offered by U.S. Games, Inc., a manufacturer of slot machines, contains a game server to control several player terminals. Each player terminal allows a player to choose from several games. This system, however, does not manage player accounts, nor does it keep track of other information deemed important by gaming establishments. Furthermore, conventional systems that provide a single game server connected to several player terminals cannot operate if the connection between the game server and a player terminal is interrupted. Also, traditional systems do not provide for remote monitoring of players and/or games being played.

In view of these obstacles as well as other considerations, there is a need for a system and method for cashless gaming that does not require coins or items of value to be input into the player terminal and that enables remote monitoring and control of player terminals.

BRIEF DESCRIPTION OF THE FIGURES

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1A:
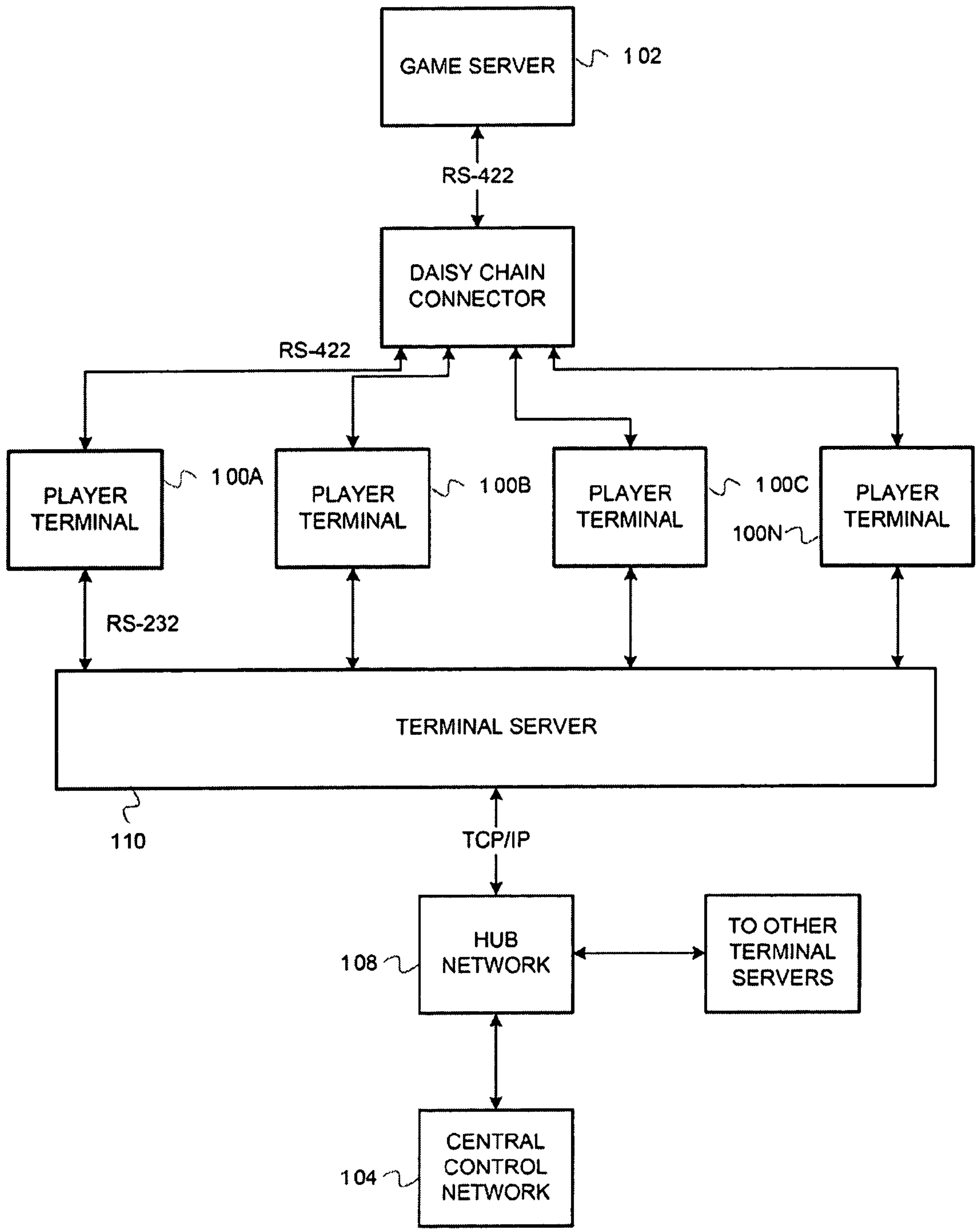
FIG. 1*a* is a block diagram of a cashless gaming system consistent with an embodiment of the present invention.

FIG. 1*a* is a block diagram of a cashless gaming system consistent with an embodiment of the present invention. As shown, the system generally comprises a plurality of player terminals 100*a*-100*n*, a game server 102 connected to each of the player terminals 100*a*-100*n*, and a central control network 104 connected to each player terminal for administering and controlling the player terminals 100 and for maintaining player accounts. A central control network consistent with the present invention may also be referred to herein as, for example, a central controller.

In one embodiment of the present invention, game server 102 may connect to player terminals 100 via a daisy-chain connection 106 and may communicate via the RS-422 protocol. Central control network 104 connects to each player terminal 100 via a hub network 108 and a terminal server 110.

In one embodiment, the system also includes a terminal server 110 connected to each player terminal 100, communicating via the RS-232 protocol. In this embodiment, terminal server 110 converts information from player terminals 100 into the TCP-IP protocol and communicates the converted messages to central control network 104 via the hub network 108. Hub network 108 may comprise, for example, an Ethernet network or the Internet.

As shown in FIG. 1*a*, a group of player terminals 100*a*-100*n* are serviced by a single game server 102 and a single terminal server 110. In one embodiment, a single game server 102 and single terminal server 110 may service up to thirty-two player terminals. Additional groups of player terminals (not shown) may be connected to central control network 104 via hub network 108.

As with the group of player terminals 100*a*-100*n*, any additional groups of player terminals may also be serviced by a single game server and connected to the hub network via a single terminal server. Thus, in accordance with the present invention, a gaming system may comprise hundreds or thousands of player terminals. A single game server and a single terminal server service a group of player terminals, and a central control network controls all the groups of player terminals.

One skilled in the art will appreciate that a single game server and/or a single terminal server may service any number of player terminals consistent with the present invention. For example, a game server and/or a terminal server may have a one-to-one or a one-to-many relationship with a player terminal.

Figure 1B:
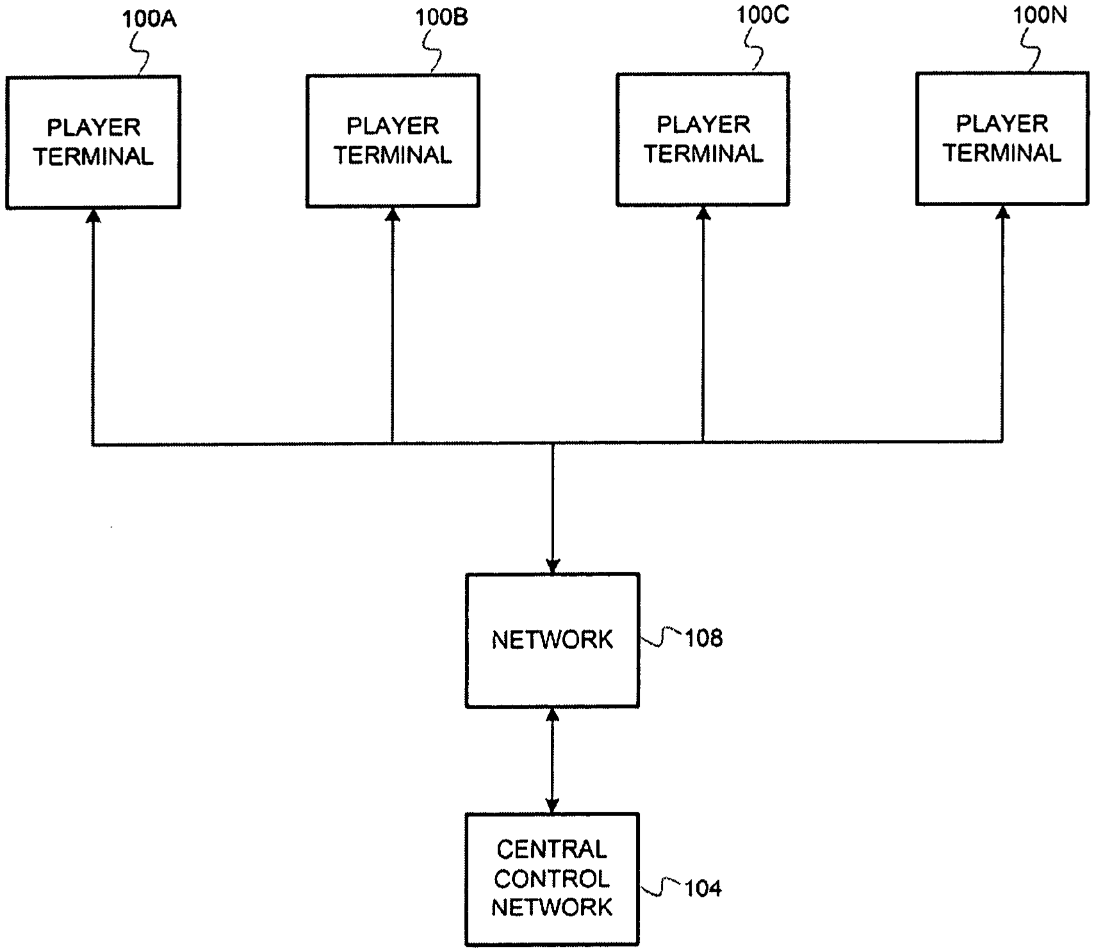
FIG. 1*b* is a block diagram of a cashless gaining system consistent with embodiment of the present invention.

FIG. 1*b* is a block diagram of a cashless gaming system consistent with another embodiment of the present invention. As shown, the system generally comprises a plurality of player terminals 100*a*-100*n* and a central control network 104 connected to each player terminal via a network 108. Network 108 may be, for example, a local area network or a wide area network such as the Internet. Central control network 104 may control player terminals 100*a*-100*n* and/or maintain player accounts. Player terminals 100*a*-100*n* and central control network 104 may communicate using, for example, TCP/IP communication.

In one embodiment of the present invention, game server 102 (not shown) may be combined with central control network 104. Alternatively, game server 102 may be combined with each player terminal 100*a*-100*n*. For example, game server 102 may include game software that is stored at central control network 104. When a player terminal 100*a* is turned on, for example, the player terminal 100*a* may download the game software from central control network 104 via network 108. Similarly, player terminals 100*a*-100*n* may download other things, such as pay tables (i.e., tables of how much is paid per win, etc.) or random number generators, from central control network 104 via network 108. One skilled in the art will recognize that player terminal 100*a* may download game software and other things on a periodic basis, such as monthly, daily, etc., or occasionally. In one embodiment, a player terminal 100 may operate autonomously for a period of time, meaning that games will not be interrupted in case network 108 fails. Also, games may be executed more quickly at a player terminal 100 that does not have to wait while information is sent back and forth to central control network 104.

In one embodiment, player terminals 100*a*-100*n* may receive data from central control network 104 on a periodic basis, for example, once a day or once an hour. This enables easy updating of games and/or pay tables because changes made at central control network 104 are easily transferred to player terminals 100. Frequent updating of this nature also reduces the risk of fraud because games and/or pay tables may be frequently changed and may be stored securely at central control network 104.

Player terminals 100*a*-100*n* (as shown in FIGS. 1*a*-1*b*) differ from conventional electronic slot machine-type video game terminals because they do not receive coins and do not payoff winners with coins. Rather, in accordance with one embodiment of the present invention, player terminals 100*a*-100*n* accept a magnetic card or key (referred to generically as magnetic card), and communicate with the central control network 104 (as shown in FIGS. 1*a*-1*b*) to debit and credit a player's account based on amounts wagered by the player for each game.

Figure 2A:
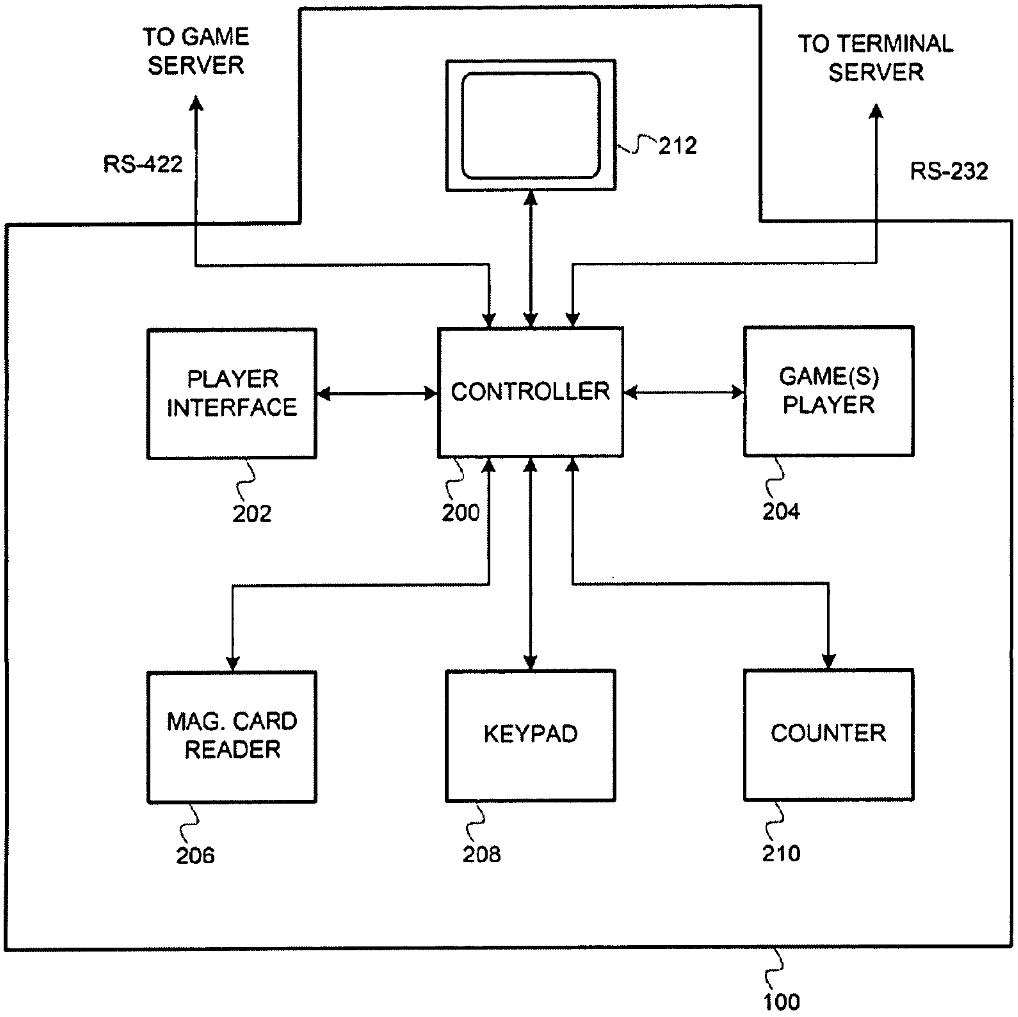
FIG. 2*a* is a block diagram of a player terminal consistent with an embodiment of the present invention.

FIG. 2*a* is a block diagram of a player terminal consistent with an embodiment of the present invention. FIG. 2*a* refers to a player terminal 100, such as, player terminals 100*a*-100*nn*. Referring to FIG. 2*a*, player terminal 100 comprises a controller 200, a player interface 202, a game player 204, a magnetic card reader 206, a keypad 208, a counter 210, and a video display 212. In one embodiment, controller 200 is, for example, a processor for directing operation of player terminal 100 and player interface 202 comprises a software application for displaying attract mode graphics to attract a player to the player terminal. In this embodiment, game player 204 comprises software applications running electronic games of chance, such as lotto, keno, bingo, etc. These games may be conventional video games of chance except that, as described below, they receive a random number from the external game server 102 (as shown in FIG. 1*a*) and base a win/lose result on that random number and the players selection. In one embodiment of the present invention, each player terminal 100 plays anyone of several games independently of the others. Thus, within a group of player terminals, such as player terminals 100*a*-100*n*, several players may be playing keno while others play lotto and still others play video poker. Regardless of the game, in this embodiment, the player terminals 100 look to the game server 102 for the random number to determine a result.

Magnetic card reader 206 comprises a conventional magnetic card reader capable of reading a credit card or smart card-type player identification card. The type of card will dictate the type of card reader.

Keypad 208 comprises a conventional alphanumeric or numeric key entry device. Keypad 208 permits a player to enter a personal identification number ("PIN") to verify the player at the player terminal 100.

Video display 212 comprises a conventional touch screen video monitor for displaying video graphics and receiving player inputs. A touch screen is not necessary, however, since player inputs can be made through keypad 208.

The counter 210 comprises a conventional digital counting device for counting a predetermined interval between game plays. Counter 210 helps synchronize operation.

As described above, electronic games of chance rely on randomly generated numbers to determine wins and losses. In one embodiment, although the video games are played by game player 204 at the player terminals, the random number from which games player 204 determines wins and loses at each player terminal is generated by the game server 102 servicing those player terminals 100.

Figure 2B:
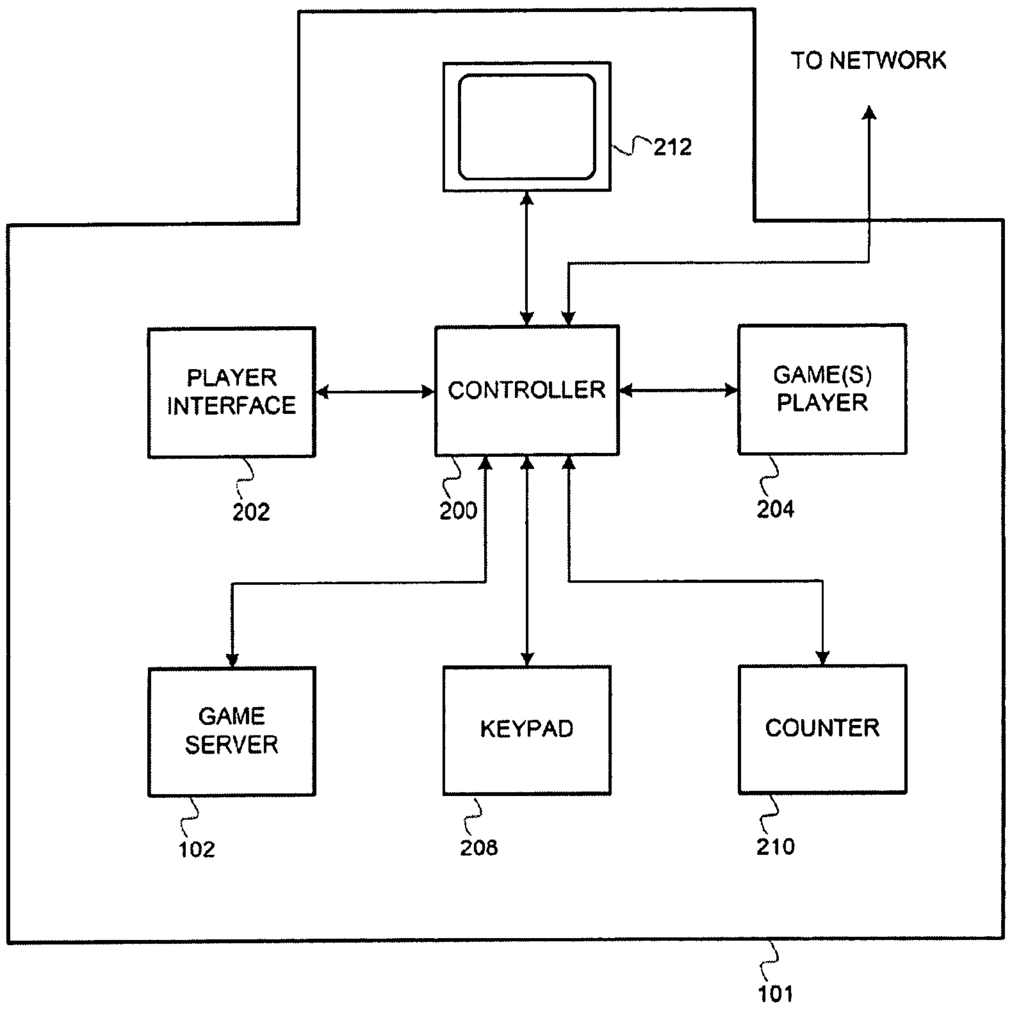
FIG. 2*b* is a block diagram of a player terminal consistent with another embodiment of the present invention.

FIG. 2*b* is a block diagram of a player terminal consistent with another embodiment of the present invention. FIG. 2*b* refers to a player terminal 101, such as, player terminals 100*a*-100*n*. In this embodiment, player terminal 101 differs from conventional video game terminals because it does not receive or dispense coins or any other item of value. Instead, player terminal 101 accepts only alphanumerical input from players, such as an account number and/or PIN number. In this embodiment, player terminal 101 comprises a controller 200, a player interface 202, a game player 204, an optional keypad 208, a counter 210, and a video display 212.

In one embodiment, controller 200 is, for example, a processor for directing operation of player terminal 101 and player interface 202 comprises a software application for displaying attract mode graphics to attract a player to the player terminal. In this embodiment, game player 204 comprises software applications running electronic games of chance, such as lotto, keno, bingo, etc. As shown in FIG. 2*b*, player terminal 101 may include a game server 102 that generates random numbers used by game player 204 to determine wins and losses. In an alternative embodiment, random numbers may be generated external to player terminal 101. For example, random numbers may be generated by a central controller, a remote monitoring system, or some other entity external to player terminal 101.

As shown in FIG. 2*b*, keypad 208 comprises a conventional alphanumeric or numeric key entry device. Keypad 208 permits a player to enter a personal identification number ("PIN") to verify the player at player terminal 101.

In an alternative embodiment, player terminal 101 does not include keypad 208 and instead a touch screen of video display 212 may be used for account number and/or PIN entry. The lack of a keypad and card reader reduces the expense of producing player terminals and reduces the likelihood of repairs. Also, this type of player terminal would not violate laws against games that accept items of value. In this alternative embodiment, player terminal 101 may appear to the player as only a video monitor, providing a great deal of flexibility in game placement. For example, such player terminals may be set into a bar top, a console, or a wall, allowing gaming to fit into almost any type of location.

Video display 212 comprises a conventional touch screen video monitor for displaying video graphics and receiving player inputs. A touch screen is not necessary, however, in an embodiment in which player inputs may be made through keypad 208, for example.

Counter 210 comprises a conventional digital counting device for counting a predetermined interval between game plays. Counter 210 helps synchronize operation.

In some embodiments of the present invention, although the video games are played by game player 204 at the player terminals, the random number from which games player 204 determines wins and loses at each player terminal is generated by the game server 102 (not shown on FIG. 2*b*) servicing those player terminals 101.

Figure 3:
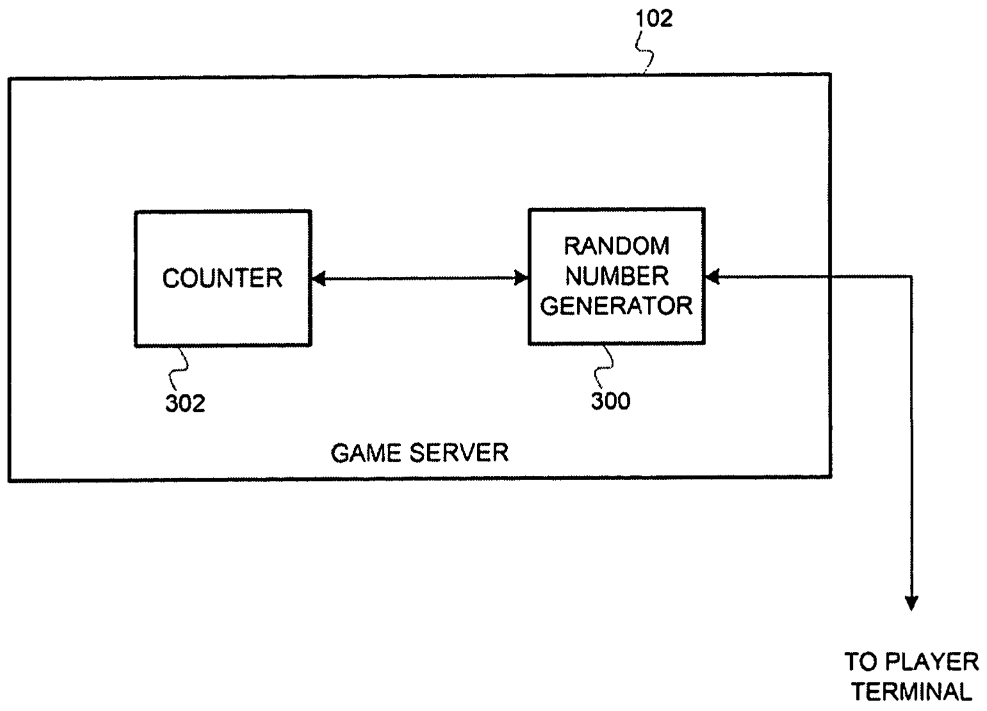
FIG. 3 is a block diagram of a game server consistent with an embodiment of the present invention.

Thus, as shown in FIG. 3, game server 102 comprises a random number generator 300 and a counter 302. In one embodiment, game server 102 generates a random number every fifteen seconds, as determined by counter 302, and transmits that random number to its associated player terminals. Of course, game server 102 may generate a random number in real-time or at any time interval. This centralization of the random number generation provides an efficient and effective means for controlling the games, increases the average number of games played, and helps reduce fraud.

In an embodiment using a predetermined interval between generations of random numbers, a player who makes a "play" during that interval must wait until that interval expires before the player terminal receives the random number and determines a win or loss for that "play." Because of the predetermined interval between generations of random numbers, a player who makes a "play" during that interval must wait until that interval expires before the player terminal receives the random number and determines a win or loss for that "play." The interval can, of course, be selected to be any predetermined interval to accommodate players and a provider of the system and games.

As shown in FIGS. 1*a*-1*b*, in accordance with the present invention, central control network 104 provides a centralized control means for monitoring and administering all video games and player accounts. Central control network 104 tracks each player activity, preferably on a per-game basis, to maintain current and comprehensive information about the players at any time during each player's session at a player terminal.

Figure 4:
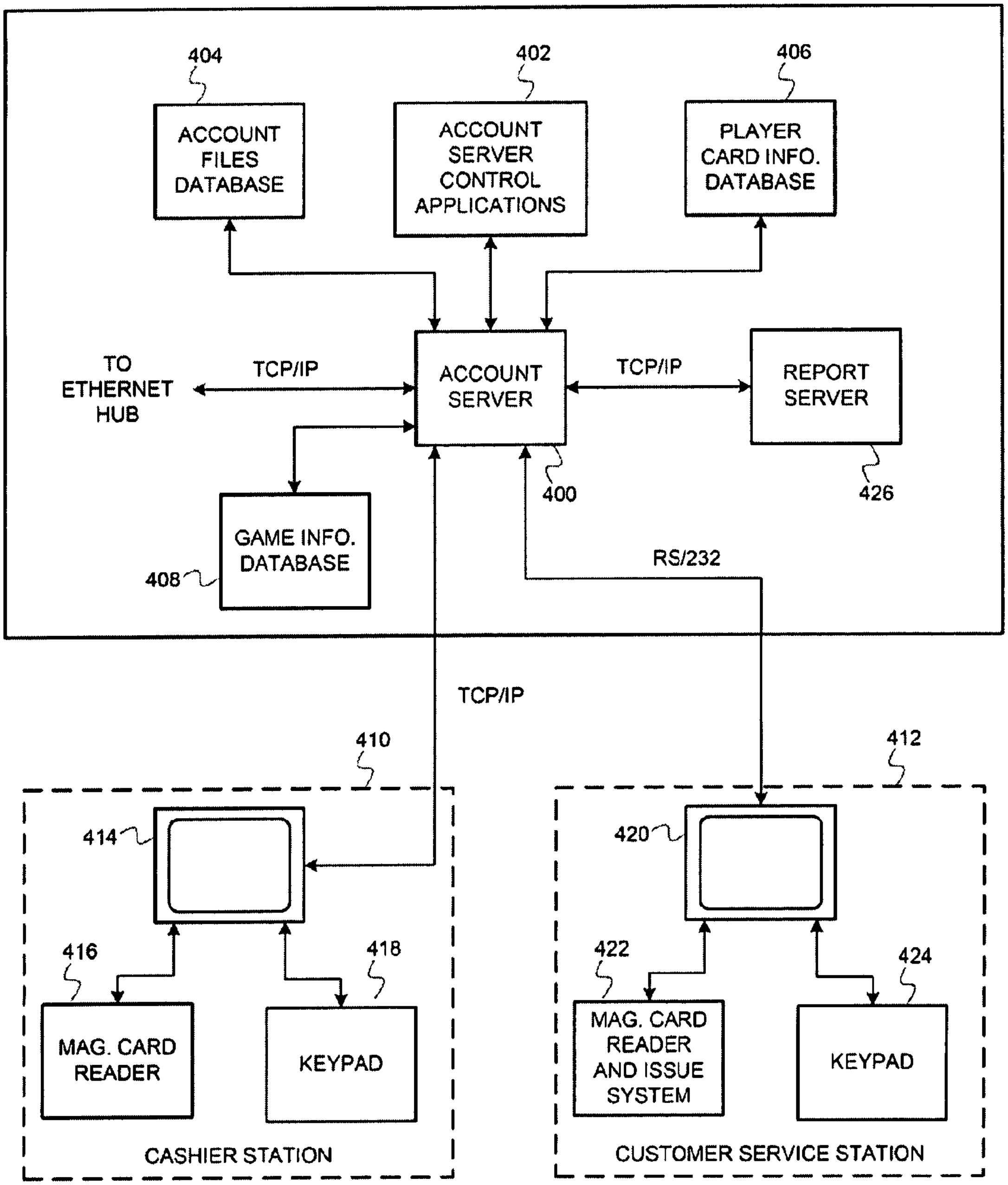
FIG. 4 is a block diagram of a central control network consistent with an embodiment of the present invention.

FIG. 4 is a block diagram of a central control network consistent with an embodiment of the present invention. FIG. 4 depicts one embodiment of a central control network 104. Central control network 104 comprises an account server 400 running control applications 402 to provide the administrative and service functions described in this application. Account server 400 stores players' account information in an account files database 404, stores player card information in a player card information database 406, and stores game result information in a game information database 408. In addition, account server 400 may control a cashier station 410 and a customer service station 412. In an embodiment of the present invention that does not use player cards, player card information database 406 may store player account information, such as a player account number and/or PIN number.

Cashier station 410 comprises an operator terminal 414, a magnetic card reader 416, and a keypad 418. Cashier station 104 is connected to account server 400, for example, via an Ethernet connection. Customer service station 412 comprises an operator terminal 420, a magnetic card issue system 422, and a keypad 424. Customer service station 412 is connected to account server 400, for example, via an RS-232 connection. Magnetic card reader 416 and magnetic card issue system 422 may comprise conventional devices for reading and generating credit card-type magnetic cards. In an embodiment of the present invention that does not use player cards, magnetic card reader 416 and a magnetic card issue system 422 would not be necessary, simplifying cashier station 410 and customer service station 412. Furthermore, an embodiment that does not use player cards reduces costs, such as the cost of the cards, card readers, and card issue systems.

Keypads 418 and 424 comprise conventional alphanumeric or numeric keypads, and terminals 414 and 420 may comprise conventional PC or networked data entry terminals.

Although account server 400 is shown as a single element of the central control network 104, in one embodiment of the present invention, account server 400 comprises a fault-tolerant configured paired STRATUS R55 computer, or any other type of hardware and/or software.

In addition to administering games and customer accounts, central control network 104 also provides reports on both using report server 426. Account server 400 preferably trickles information from its databases 404, 406, and 408 to report server 426, which in turn generates customized or standardized reports in accordance with a service provider's requirements. Report server 426 may comprise, for example, a RS-6000 computer, or any other type of hardware and/or software.

At service station 412, a player wishing to use a player terminal can establish an account and receive a magnetic I.D. card to operate the player terminal. A player may provide an operator with some identifying information, and the operator uses terminal 420 to transmit this information to account server 400. Account server 400 establishes an account file for the player in account files database 404 and assigns a corresponding account number to that player. In addition, the operator may ask the customer to select a PIN via keypad 424. The player identifier information, the account number, and an encrypted version of the PIN is then stored on a magnetic strip of a magnetic I.D. card issued by the magnetic card issue system 422. In an embodiment that does not use player cards, a player may receive a slip of paper containing the player's account number and/or PIN number or the operator may simply tell the player the account number and/or PIN number.

Although not shown, customer service station 412 may also include a scanning device for scanning and storing a player's signature or photograph. Likewise, customer service station 412 may include camera for photographing the player and including a picture on the player's I.D. card. Account server 400 stores the player's identification information in the player card information database 406. Any scanned information may be stored in a separate file server. Finally, the customer server station 412 may include a printer device to print, for example, customer receipts.

After receiving an I.D. card, the player proceeds to a cashier station 410 to deposit money into his or her account. An operator swipes the card through the magnetic card reader 416 to credit the account via the keypad 418 after receiving payment from the player. In an embodiment that does not use player cards, a player may give the operator a slip of paper containing the player's account number and/or PIN number, or may simply tell the operator the account number and/or PIN number, or may enter the account number and/or PIN number into keypad 418. Account server 400 stores the player's account information in the account files database 404.

Cashier station 410 also serves to pay players having positive account balances at the end of their play sessions. To receive money, a player provides an operator at cashier station 410 with his/her I.D. card. The operator swipes the I.D. card to retrieve tile account balance information, verifies the player by requesting the player to input his/her PIN via keypad 418, and pays the player any positive account balance. In an embodiment that does not use player cards, a player may give the operator a slip of paper containing the player's account number and/or PIN number, or may simply tell the operator the account number and/or PIN number, or may enter the account number and/or PIN number into keypad 418.

Although shown as two separate stations, cashier station 410 and customer service station 414 may be combined as a single customer service/cashier station.

Figure 5A:
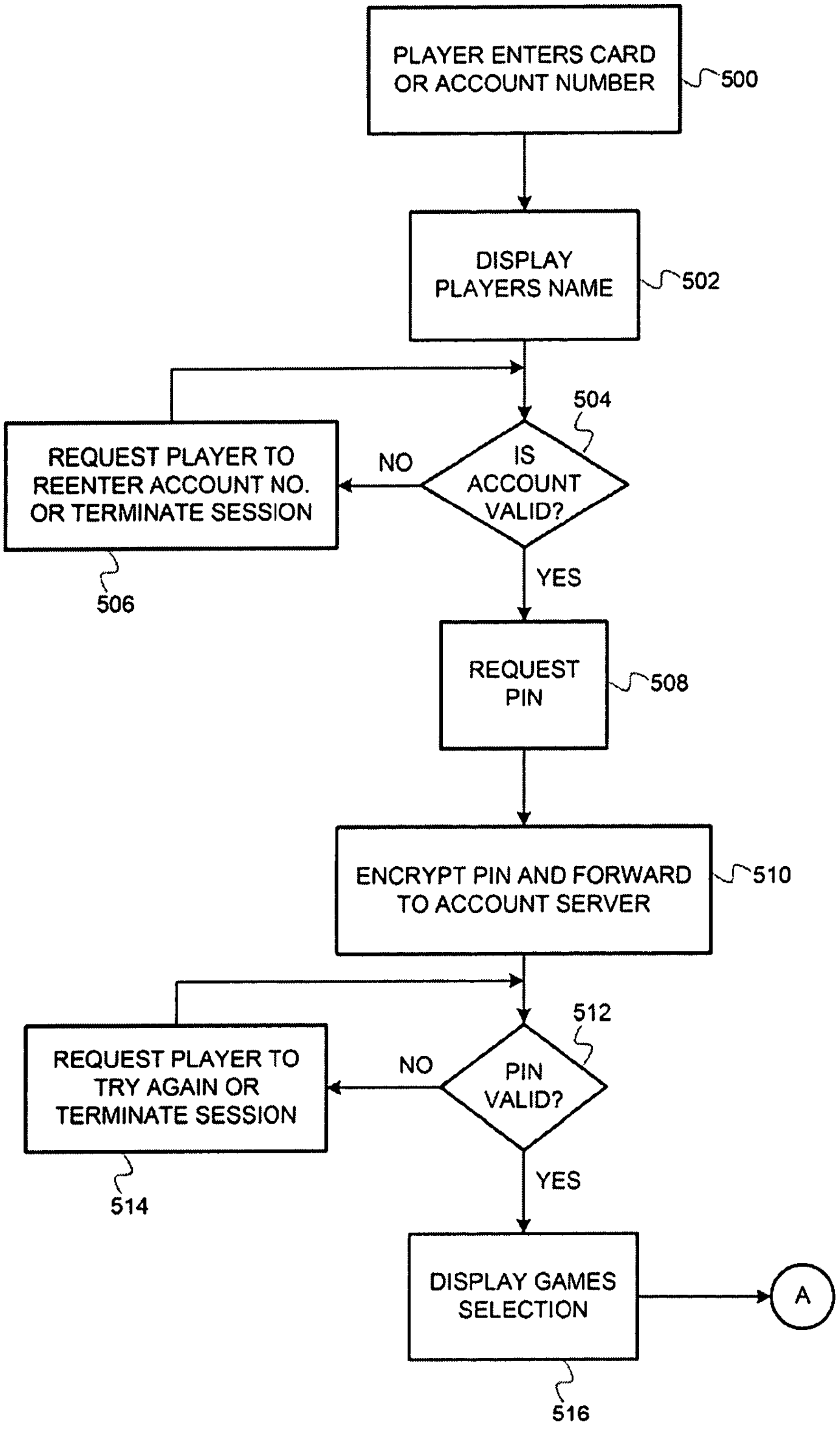
FIGS. 5*a* and 5*b* are process flow diagrams illustrating a method of operating a cashless gaming system consistent with an embodiment of the present invention.
Figure 5B:
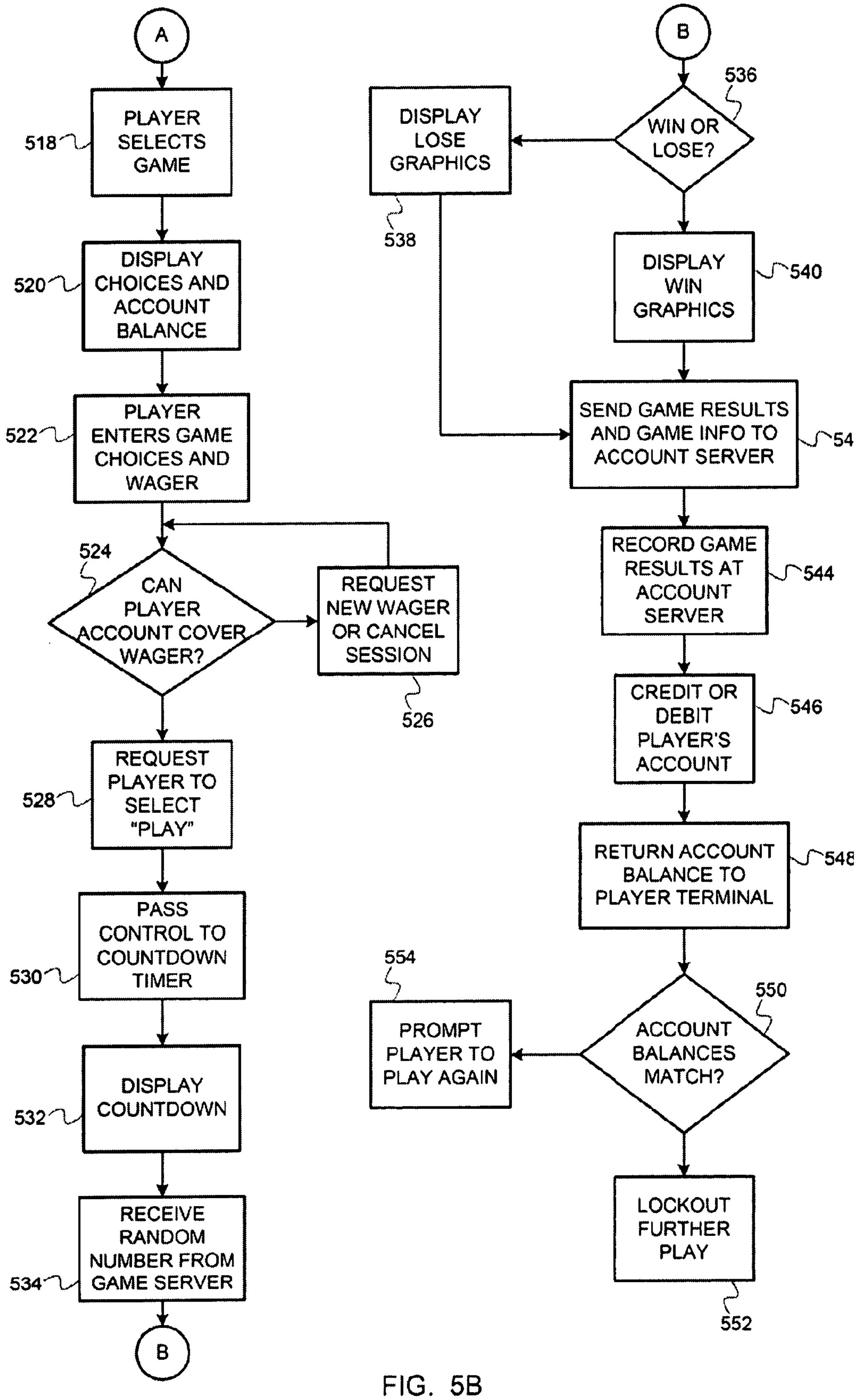

To help illustrate the operation of the cashless video game system of the present invention, FIGS. 5*a* and 5*b* are process flow diagrams illustrating a method of operating a cashless gaming system consistent with an embodiment of the present invention. Referring to FIG. 5*a*, after opening a player account and obtaining a player 1.0. card, a player logs onto a player terminal, such as player terminals 100 or 101, by inserting the 1.0. card into the magnetic card reader 206 (stage 500). Alternatively, the system does not require player I.D. cards, so the player simply enters his/her assigned player account number using keypad 208. In another embodiment that does not use a keypad, the player may enter the account number and/or PIN number using a touch screen of video display 212.

The player terminal which has been executing attract mode graphics, reads the information from the 1.0. card (or from the keypad or touch screen), displays the player's name (stage 502), sends the player account number to the account server 400, and requests the account server 400 to verify the player's account number. Account server 400 receives the account number and, referring to the account file database 404, determines whether the player account number is valid (stage 504). If not, the player terminal informs the player and either requests the player to reenter the account number or terminates the session (stage 506).

If account server 400 determines that the account number is valid, the player terminal requests the player to enter his/her PIN (stage 508). In one embodiment, the player terminal encrypts the PIN and forwards the encrypted PIN to the account server 400 (stage 510). Account server 400 receives the PIN and determines whether the PIN is valid and corresponds to the player's account number (stage 512). If the PIN is not valid or does not correspond to the player's account number, the player terminal either requests the player reenter the PIN, or terminates the session (stage 514). If the PIN is valid, the player terminal displays a graphical selection of video games on video display 212 (stage 516). As described, the video games may include keno, lotto, bingo, etc.

Using the touch screen video display 212 or keypad 208, the player then selects a desired game (stage 518). The player terminal displays the corresponding game graphics and requests the player to enter game choices corresponding to that game (stage 520). For a particular game, a player may have to make certain selections required by the rules of each game including a selection of predetermined numbers, colors, and/or symbols. For example, if the player selects keno, video display 212 may display eighty numbers from which the player selects up to twenty numbers via the video display screen 212. The player terminal also displays the account balance during a player session.

The player then enters his/her game choices and a wager amount (stage 522). In one embodiment, video display 212 also displays the wager amount during each game. The player terminal responds to the waged amount by requesting account server 400 to verify that the player has a sufficient balance in the his/her account to cover the wager.

When account server 400 receives this request from the player terminal, it makes the requested determination (stage 524). If the player has insufficient funds to cover the wager, the player terminal so informs the player and either requests the player to enter a new wager consistent with the player's account balance or terminates the session (stage 526). If account server 400 determines that the account balance is sufficient to cover the wager, the player terminal informs tile player that he/she is authorized to play and requests the player to select a "play" button on the video display 212 or keypad 208 (stage 528). Once the player selects the "play" button, the player terminal passes control to counter 210 (stage 530) and waits to receive a random number from the corresponding game server 102.

Again, in one embodiment, because game server 102 is generating a random number at a predefined interval, the player who has selected the "play" button during the interval must wait until the player terminal receives the random number to determine the results of the play. Counter 210 in player terminal 100 keeps track of this interval and, in one embodiment, may display the time remaining between the player's selection of the "play" button and the determination of a win or loss (stage 532).

At the end of the interval, game server 102 generates a random number and sends it to each corresponding player terminal. The player terminal receives the random number from the game server (stage 534) and determines whether the player has won or lost that game (stage 536). In an alternative embodiment, game server 102 may be part of player terminal 100 and no delay occurs after the player selects the "play" button. If the player has lost, the player terminal displays preselected loss graphics explaining the losing results (stage 538). If the player wins, the player terminal displays preselected win graphics explaining the winning results (stage 540).

Win or lose, the player terminal sends a packet of information to the account server 400. This information might include the player's account number, information on the game played and the game choices selected by the player, the waged amount, the winning numbers provided by the game server 102, and a credit or debit request for crediting or debiting the player's account the waged amount (stage 542). In accordance with the present invention, some or all of this information may be encrypted in accordance with conventional encrypting techniques. As described below, the player terminal also maintains the player's account balance during a player session.

The account server 400 responds to the data from the player terminal by recording the game information in the game information database 408 (stage 544) and crediting or debiting the player's account by the waged amount (stage 546). Account server 400 then preferably returns the updated account balance to the player terminal (stage 548). The player terminal determines whether the returned account balance matches the account balance being tracked by player terminal 100 (stage 550). This additional monitoring of the player's account balance helps protect the game service provider and the player by reducing fraud and detecting balance inconsistencies as early as possible, for example, on a per-game basis. If the account balances do not match, the player terminal may prevent the player from continuing and request service assistance (stage 552). If the account balances match, the player terminal prompts the player to choose whether to play again (stage 554).

When a player has finished playing, he/she exits the player terminal using an appropriate touch screen command on video display 212 or key on the keypad 208 and returns to the cashier station 410 to settle his/her account. As described, using cashier terminal 414, a cashier or operator (not shown) requests the player account information from the account server 400 and redeems the balance of the player's account to the player.

In an embodiment consistent with the present invention, player terminals 100*a*-100*n* transmit real-time to account server 400 all player activity information input by the player. This information may include, for example, the player's account number, information on the game played, and the game choices selected by the player, the wager amount, the winning numbers provided by the game server 102, and a credit or debit request for crediting or debiting the player's account the wager amount. Account server 400 stores player activity information at account files database 404 and player card information database 406. The player card information includes player demographics data such as age, gender, and geographic location. Accordingly, central control network 104 maintains a current and comprehensive player activity information and demographics of each player, which may be accessed at any time by authorized personnel.

Report server 426 may provide a report of varying specificity including a detailed listing of an individual player's activity for a specified time period, a summary of a player's activity over a period of time, actual number of games played by each player, and a summary of all players' activity on a particular day or over a period of time. Report server 426 generates these reports periodically, for example, once every two minutes. Server 426 may then generate a player activity report outlining player gambling habits such as frequency of plays, favorite games, nomination of player terminals, and average amount of wagers. Such player tracking is valuable to casinos and players. Based on such reports, for example, casinos may tailor the types, number, and wager amount of games offered at player terminals 100*a*-100*n* to accommodate player demand. Player terminals 100*a*-100*n* may be modified periodically or interactively based on current player demand.

Additionally, casinos may use the reports as a tool to identify players with certain characteristics for marketing purposes. One marketing tool may be to offer "free play" cards, which are unique player cards with non-redeemable, playable credits. Such cards may be used as an incentive to attract players to the casino. Casinos may also offer complimentary "free play" cards to players who spend a certain weekly amount playing games. A player's account number along with an expiration date and time of the free play cards may be printed on the card. Upon expiration of such date and time, player terminals 100*a*-100*n* will not recognize the free play card. Additionally, casinos may program cashier stations 410 to restrict withdrawals on the free play cards to only amounts greater than the face value of tile card. The redemption period may also be restricted, for example, as a predetermined number of days after the expiration date. In a system that does not use cards, players may be given free play numbers, i.e., special numbers that correspond to non-redeemable, playable credits. Free play numbers may be used in a similar fashion as free play cards, except that players may input the free play number using a keypad or touch screen rather than swiping a card.

Central tracking of all player activity on a per-game basis helps better tailor player terminals 100*a*-100*n* abased on player use and demand, reduce fraud, and target marketing efforts to players with certain attributes. Additionally, instantaneous information provides greater flexibility for managing gaming establishments. For example, such information may enable a gaming establishment to access information whether player habits qualify for special awards during the play. It also helps detect fraud while it is occurring, for example, by detecting wins that far exceed average statistical odds or a single player playing at multiple player terminals 100*a*-100*n* simultaneously. Moreover, real-time maintenance of player activity enables accurate system recovery in emergency situations such as power outage.

Figure 6:
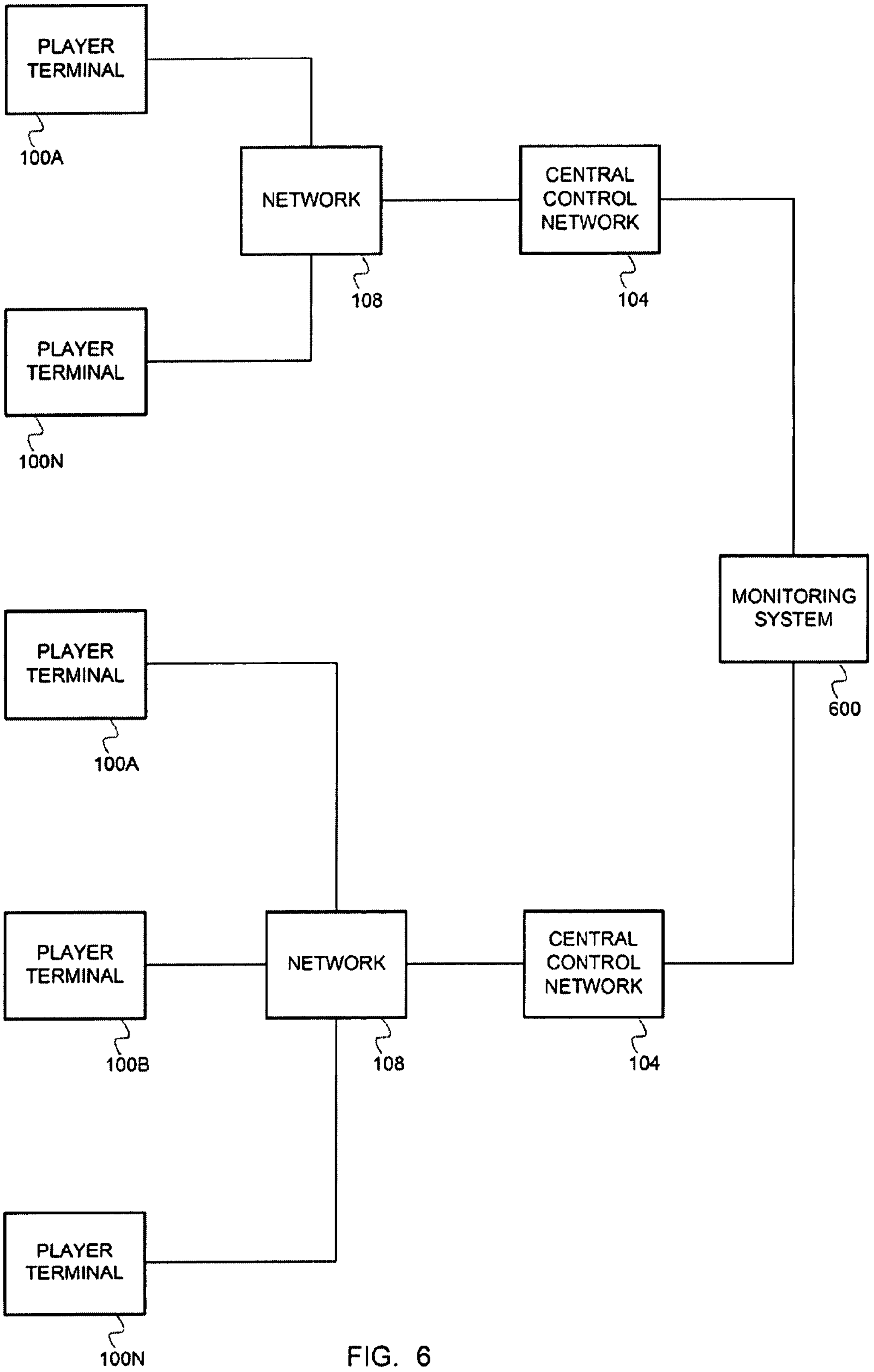
FIG. 6 is a block diagram of a system including a remote monitoring system consistent with an embodiment of the present invention.

FIG. 6 is a block diagram of a system including a remote monitoring system consistent with an embodiment of the present invention. A monitoring system 600 may correspond to a plurality of central control networks 104 at a plurality of locations. Each location may include a plurality of player terminals, such as player terminals 100 or 101, connected to a central control network 104 via a network 108. Each location may include any number of player terminals.

In a traditional gaming location, such as a casino, all of the player terminals are in one location, giving gaming operators immediate control and monitoring of the games. If a player terminal has a problem, the gaming operator may go out onto the gaming floor and unplug or remove the game. Monitoring system 600 maintains this type of control and supervision in more flexible gaming environments.

For example, a number of bars and restaurants in a town may each have a central control network and several player terminals. A gaming operator, or "route operator," may be responsible for monitoring all of the player terminals in the town and may have a monitoring system 600 located at a secure location in the town. Using monitoring system 600, the route operator may track player activities at all of the bars and restaurants from a single location. In one embodiment, monitoring system 600 may have the capability to disable a player terminal, for example, if fraud is suspected or for maintenance. This embodiment may be used to comply with laws in jurisdictions that require strict supervision and control over games. This type of embodiment also reduces the risk to game operators that provide games at remote locations.

Monitoring system 600 may include copies of some or all of the components of a central control network 104, such as an account server 404 for control applications and a report server 426 (as shown in FIG. 4 and described above). Monitoring system 600 may include, for example, a printer for printing invoices, reports, etc. Monitoring system 600 may track the amount of money in player accounts, the amount of money in play at anyone time, net wins or losses, etc. Monitoring system 600 may be used, for example, to generate invoices for individual players, for each remote location. etc. Using high speed connections between monitoring system 600 and central control networks 104, such as high speed Internet connections, enables near real-time tracking by monitoring system 600. Furthermore, changes may be made to game software, pay tables, etc. stored at monitoring system 600 and sent to the player terminals via central control networks 104, providing maximum flexibility.

One skilled in the art will recognize that many different arrangements of player terminals, central control networks, and monitoring systems may be used consistent with the present invention. For example, monitoring system 600 may be provided at a government office to enable a government or regulatory agency in a jurisdiction to regulate gaming, improve security, and reduce fraud.

Other embodiments of the invention will be apparent to those skilled in the art from consideration of the specification and practice of the invention disclosed herein. For example, the figures and description describe games of chance based on random numbers. However, games of skill could also be played consistent with the present invention. For instance, game software and pay tables may be modified to add a "re-spin" feature to a spinning reel slot machine game, e.g., enabling a player to spin one reel again once the game has finished. In this way, the player may affect the outcome of the game. This type of game may be used, for example, in a jurisdiction that requires some skill or dexterity in gaming.

It is intended that the specification and examples be considered as exemplary only, with a true scope and spirit of the invention being indicated by the following claims.

The invention claimed is:

1. A wagering game system comprising:

a plurality of player terminals configured to present wagering games and to collect player activity information associated with the wagering games, the player activity information indicating player inputs and financial transactions, wherein the plurality of player terminals includes a first plurality of player terminals at a first location and a second plurality of player terminals at a second location;

a plurality of account servers configured to receive the player activity information and to perform the financial transactions on player accounts, wherein the plurality of account servers includes a first account server at the first location and a second account server at the second location; and a monitoring system configured to receive the player activity information, to detect fraud at the plurality of player terminals, and to remotely disable ones of the plurality of player terminals, and wherein the monitoring system is further configured to receive copies of the player activity information received at the first and second account servers.

2. The wagering game system of claim 1, wherein the monitoring system is configured to remotely disable ones of the plurality of player terminals based on the player activity information.

3. The wagering game system of claim 1, wherein the monitoring system is configured to disable ones of the player terminals based on input from an operator.

4. The wagering game system of claim 1, wherein the monitoring system is further configured to receive the player activity information in near real-time to enable remote monitoring of player activities at the player terminals.

5. The wagering game system of claim 1, wherein the monitoring system is further configured to store game software and pay tables and send the game software and pay tables to the plurality of player terminals.

6. A machine-readable medium including instructions executable by a machine, the instructions comprising:

instructions to receive player activity information, wherein the player activity information includes player inputs made at remote player terminals and results of electronic wagering games presented at the player terminals;

instructions to detect, based on the player activity information, fraud at the player terminals; and instructions to disable one or more of the player terminals.

7. The machine-readable medium of claim 6, wherein the instructions further comprise:

instructions to detect that maintenance is needed on one or more of the player terminals.

8. The machine-readable medium of claim 6, wherein the player activity information is received from the player terminals in near real-time.

9. The machine-readable medium of claim 6, wherein receipt of the player activity information from the player terminals to occur in near real-time via a control network co-located with the player terminals.

10. The machine-readable medium of claim 6, wherein the instructions further comprise:

instructions to send software and pay tables to the player terminals, the software and pay tables for use in presenting the wagering games.

11. The machine-readable medium of claim 6 further comprising:

instructions to generate, based on the player activity information, reports indicating player preferences associated with the electronic wagering games.

12. The machine-readable medium of claim 6, wherein the player activity information further indicates one or more selected from the set consisting of player account numbers, information about the electronic wagering games, and amounts wagered on the electronic wagering games.

13. The machine-readable medium of claim 6, wherein receipt of the player activity information occurs in real-time over a network.

14. A method comprising:

receiving, over a network, player activity information including financial transactions and player selections made at player terminals, wherein the player terminals reside at a plurality of gaming locations;

determining, based on the player activity information, that fraud has occurred at one or more of the player terminals; and disabling at least one of the player terminals based on the fraud.

15. The method of claim 14 further comprising:

determining, based on the player activity information, that events have occurred at one or more of the player terminals;

modifying pay tables at one or more of the player terminals based on the events at the one or more of the player terminals.

16. The method of claim 14, wherein the player activity information is received from the player terminals in near real-time to facilitate remote supervision of the player terminals.

17. The method of claim 14, wherein the player activity information is received from a player account server residing remotely from gaming locations.

* * * * *